April 28, 1964   A. ROSENFELD ETAL   3,131,344
PROTECTIVE SYSTEM FOR TRANSISTOR REGULATOR
Filed Aug. 1, 1958                               2 Sheets-Sheet 1

INVENTORS
Aaron Rosenfeld
Kenneth Kupferberg
BY
ATTORNEY

INVENTORS
Aaron Rosenfeld
Kenneth Kupferberg
BY
ATTORNEY

United States Patent Office 3,131,344
Patented Apr. 28, 1964

3,131,344
PROTECTIVE SYSTEM FOR TRANSISTOR
REGULATOR
Aaron Rosenfeld, Jackson Heights, and Kenneth Kupferberg, Flushing, N.Y., assignors to Forbro Design Inc., New York, N.Y., a corporation of New York
Filed Aug. 1, 1958, Ser. No. 752,579
1 Claim. (Cl. 323—22)

This invention relates to regulated direct current power supplies using transistors and, more particularly, to novel means for preventing failure of transistors due to overheating upon occurrence of an accidental short circuiting of the output terminals.

Regulated power supplies are closed loop feed-back systems in which, if an output characteristic, such as the voltage, varies from a predetermined value, a variation sensing arrangement causes a corrective signal to be applied in a direction to restore the output characteristic to its predetermined value. Consequently, if the output terminals are short circuited, accidentally or otherwise, the regulating arrangement would attempt to increase the current supplied to the load to restore the voltage, for example, to its predetermined value. With a short circuit an infinite amount of current would have to be supplied to effect such voltage restoration. The current delivered to the load would thus increase indefinitely, being limited only by the internal resistance of the power supply.

This internal resistance is quite low, particularly in the case of transistorized power supplies. Consequently, the full input voltage and the full current which the supply is capable of delivering would be applied to the control or pass transistor. The resultant overheating will almost invariably destroy this transistor.

In accordance with the present invention, the current flow upon short circuit is effectively limited by novel and simple circuit modifications of the power supply. More specifically, a resistor is connected in series between the pass transistor and the output terminals, and a diode-resistance combination is connected across this resistor and the transistor. The relative values are so selected that, upon current flow through the transistor exceeding a pre-set value, the voltage drop across the resistor is varied in such a manner as to reduce the bias applied to the transistor to a value limiting the current flow therethrough to such pre-set value.

For an understanding of the invention principles, reference is made to the following descriptions of typical embodiments thereof as illustrated in the accompanying drawings. In the drawings.

Figure 1:
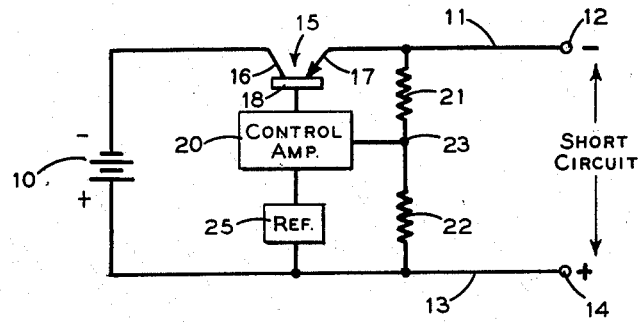
FIG. 1 is a schematic wiring diagram, for illustration purposes, of a transistorized power supply without any short circuit current limiting arrangement.

Referring to FIG. 1, there is shown therein a regulated power supply comprising a source of input power 10, schematically illustrated as a battery, a transistor 15, a control amplifier 20, and a reference voltage source 25. Collector 16 of transistor 15 is connected to the negative terminal of source 10, and emitter 17 is connected by conductor 11 to output terminal 12. The positive terminal of source 10 is connected by conductor 13 to output terminal 14. A voltage divider 21, 22 is connected across conductors 12, 14, and amplifier 20 is connected between transistor base 18 and a tap 23 on divider 21, 22. Reference 25 is connected between amplifier 20 and conductor 13.

The desired regulated output voltage at terminals 12, 14 is selected by adjustment of tap 23 with reference to voltage reference 25. When the output voltage varies from its pre-set value, the differential of the output and reference voltages controls amplifier 20 to vary the emitter-base bias of transistor 15 in a direction to vary the emitter-collector current to restore the output voltage to its pre-set value.

When terminals 12, 14 are short circuited, reference 25, amplifier 20, and transistor 15 are signalled to restore the voltage to its pre-set value. The current flow increases to the full limit of source 10 in an attempt to provide sufficient current flow. The greatly increased current flow overheats and generally destroys transistor 15.

Figure 2:
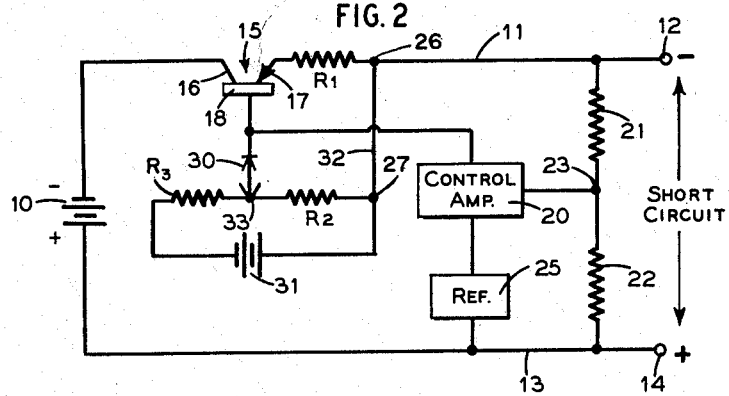
FIG. 2 is a schematic wiring diagram of the transistorized power supply of FIG. 1 modified to incorporate a short circuit current limiting arrangement embodying the invention.

Referring to FIG. 2, in accordance with the invention, the short circuit current flow is limited to a pre-set value in the following manner. A fixed resistor R-1 is connected between emitter 17 and terminal 12 and has a value such that, at the desired maximum current, a voltage V-1 is developed thereacross. A second voltage divider R-2 plus R-3 is connected across an auxiliary source 31, and a conductor 32 connects the positive terminal of source 31 to the end of resistor R-1 nearest terminal 12. Tap 33 of this second voltage divider is connected to base 18 through a diode 30.

Tap 33 is adjusted so that, at the desired maximum current flow, the voltage V-2 developed across resistance R-2 by source 31 will be equal to the voltage V-1 developed across resistor R-1 by the load current. Assuming for purpose of illustration that the emitter-base voltage required for the desired maximum current flow through transistor 15 is zero volts, then as soon as V-1 exceeds V-2 diode 30 conducts and attempts to bias transistor 15 in the direction of reduced current. The maximum current that can be drawn is thus limited to the value determined above. Hence, there will be no overheating of the transistor upon short circuiting of terminals 12, 14.

More specifically, junction points 26 and 27 are at the same potential, which is that of the positive terminal of battery 13. With the voltage divider R-2 and R-3 so adjusted that, at the maximum desired load current, the voltage drop across R-1 is equal to the voltage drop across R-2, the potential of tap 23 will be the same as the potential at emitter 17. Up to, and including, this current, the emitter 17 is positive relative to base 18 by a variable amount adjusted by the action of control amplifier 20. If the load current now increases above the desired maximum value, the voltage drop across resistance R-1 will exceed that across resistance R-2. Hence, the tap 33 will become positive relative to emitter 17, due to the fact that tap 33 is now at a potential which more closely approaches the positive potential of battery 31 than does the potential of emitter 17. Diode 30 therefore conducts and applies a positive potential to base 16 which cuts off the transistor 15. This positive potential is equal to the positive potential of battery 31 less the pre-set voltage drop across resistance R-2 and, in addition, is sufficient to over-balance the control potential provided from the control amplifier 20. Hence, the control amplifier 20 is of no effect any longer in controlling the conductivity of transistor 15. With the transistor 15 non-conductive, it acts like an open switch and there is no current flow to the load.

The circuit of FIG. 2 fully protects the pass transistors in cases where the transistor heat dissipation rating is such that the transistors can handle the full output voltage of source 10 at the same time that the power supply is delivering maximum load current. There are, however, fixed output voltage power supplies where the maximum design voltage across the pass transistor is only a fraction of the full supply voltage. In these cases, under short circuit conditions, the maximum current is limited by the arrangement of FIG. 2, but the voltage across the transistor is greater than such design voltage. Hence, the transistor is subject to destruction by overheating due to the excess voltage thereacross. In order to protect against this contingency, it is necessary to limit the maximum current to a value sufficiently less than the maximum supply current that the desired limited maximum current multiplied by the maximum supply voltage is within the heat dissipation rating of the pass transistor.

Figure 3:
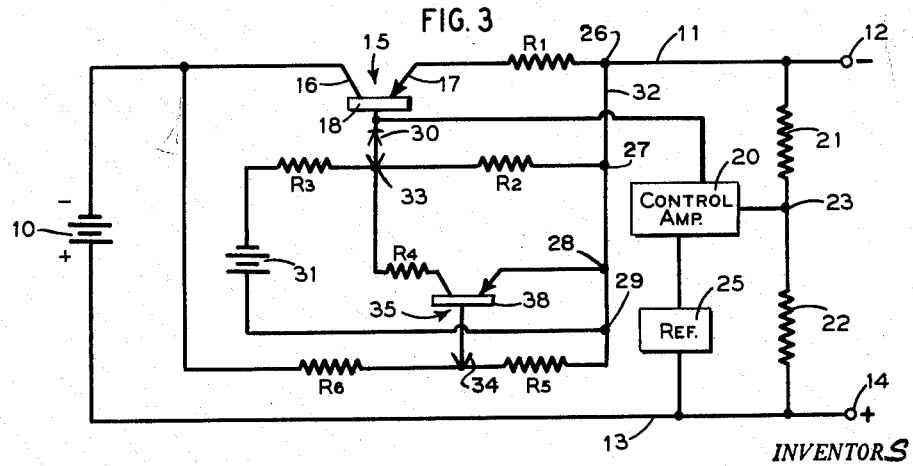
FIG. 3 is a schematic wiring diagram corresponding to FIG. 1 but incorporating over-voltage protection in accordance with the invention.

Referring to FIG. 3, a second transistor 35 is connected across resistance R–2 in series with a resistance R–4, and a third voltage divider R–5 plus R–6 is connected across transistor 15 and resistor R–1. Tap 34 of divider R–5, R–6 is connected to base 38 of transistor 35. Divider R–5, R–6 measures the voltage drop across transistor 15 and resistor R–1. When this voltage drop exceeds a pre-set value, the emitter-base bias of transistor 35 is such that this transistor conducts to connect resistance R–4 in parallel with resistance R–2. This reduces the resistance in series with diode 30 to an extent such that the anode potential of diode 30 limits the drop across resistor R–1 to a value less than that determined by R–2 alone. Consequently, the current through pass transistor 15 is reduced to a safe value.

Junction points 26, 27, 28, and 29 are all at the same potential which is that of the positive terminal of auxiliary battery 31. As stated, divider R–5 plus R–6 measures the total voltage drop across transistor 15 and resistor R–1. Thus, as the load current increases, resulting in a greater drop across resistor R–1, there will be a greater potential drop across resistor R–5. Consequently, tap 34 will become relatively more negative as compared to tap 28. This will cause the transistor 35 to become more conductive, and thus act as a closed switch placing resistance R–4 in parallel with resistor R–2. Due to the resistors R–2 and R–4 being in parallel, the voltage drop between points 27, 28 and diodes 30 will be substantially decreased causing diode 30 to conduct. Diode 30 thus applies a positive potential to the base 18 of transistor 15, biasing this transistor to cut off. The transistor then acts as an open switch preventing any flow of current to the load. Also, the positive potential thus applied to the base 18 through diode 30 substantially overbalances any control potential applied to this base by control amplifier 20 so that this control amplifier is no longer of any effect in regulating the current. This condition continues until such time as the short circuit is removed.

Figure 4:
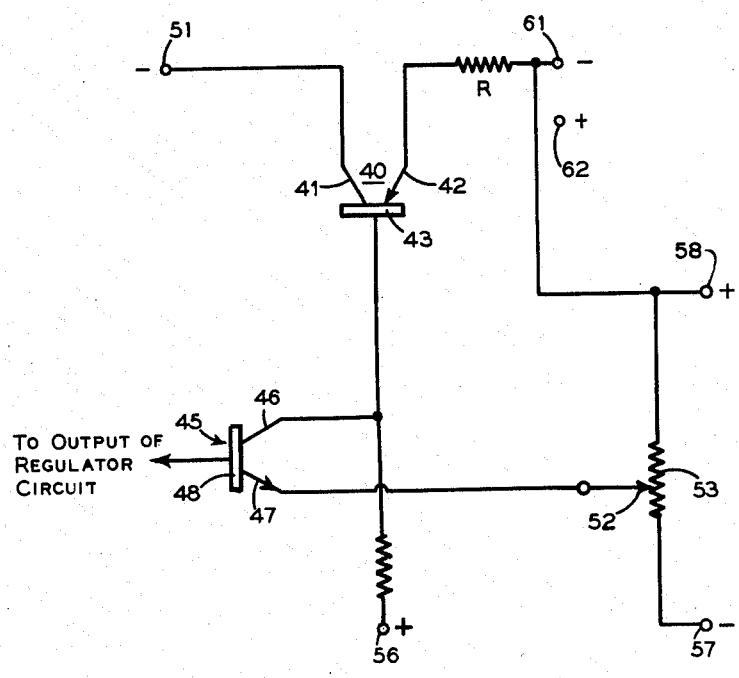
FIG. 4 is a schematic wiring diagram of a further embodiment of the invention.

FIG. 4 shows an alternative embodiment of the invention as used in a commercial transistorized power supply. In this FIG. 4, the collector 41 of a pass transistor 40 is connected to the negative terminal 51 of a power input source, and emitter 42 is connected to negative output terminal 61. Base electrode 43 is connected to collector 46 of transistor 45, which is connected through a resistor to positive terminal 56 of an auxiliary source of voltage. Transistor 45 is the final stage of amplifier driving pass transistor 40. Emitter 47 is connected to tap 52 of a voltage divider 53 connected across terminals 57, 58.

Transistor 45 acts like a diode when its collector voltage tries to go more negative than its base voltage. The base voltage of transistor 40 is thus limited to the base voltage of transistor 45, and therefore to the voltage of emitter 47. This latter voltage is set by adjustment of tap 52. The collector 46 voltage increases in a negative direction with increased emitter current of pass transistor 40, because of increased voltage drop across resistor "R," and forward diode characteristic of transistor 40.

It will be noted that transistor 40 is a PNP transistor, and transistor 45 is a NPN transistor. As the current through resistor R increases, the voltage of emitter 42 becomes more negative due to the drop across resistor R. In turn, base 43 becomes more negative, and thus collector 46 of transistor 45 becomes more negative. Consequently, transistor 45 tends to become fully conductive and act as a closed switch so that the voltage applied to collector 46 is equal to the voltage on emitter 47. This is adjusted, as stated above, by the movable contact 52 and, under these conditions of a current in excess of the maximum design current, the voltage selected is such that, when applied to base 43 of transistor 40, this transistor is rendered non-conductive to act as an open switch preventing further flow of current to the load. With transistor 45 thus rendered fully conductive, due to the more negative voltage on its collector 46, the control signal applied from the control amplifier or the like is of no effect on the conductivity of the transistor until such time as the current has dropped below the desired maximum value. At such time, the control action of transistor 45 is resumed.

While specific embodiments of the invention have been shown and described in detail to illustrate the application of the invention principles, it will be understood that the invention may be embodied otherwise without departing from such principles.

What is claimed is:

A regulated power supply comprising, in combination, an input power supply; a pair of output terminals; a transistor connected in series with said input power supply and said output terminals; said transistor carrying the load current in proportion to a bias voltage applied to one of its electrodes; a resistor in series connection with said transistor and one of said output terminals having a voltage drop thereacross corresponding to the load current; and a reference voltage source in series with a diode connected to the last said terminal and said transistor and operable, responsive to increase in such voltage drop beyond a predetermined value to reverse the bias of said transistor to condition the latter non-conductive to limit the load current to a preset value.

References Cited in the file of this patent
UNITED STATES PATENTS

| 2,809,301 | Short | Oct. 8, 1957 |
| 2,888,633 | Carter | Mar. 26, 1959 |
| 2,896,151 | Zelinka | July 21, 1959 |
| 2,904,742 | Chase | Sept. 15, 1959 |
| 2,915,693 | Harrison | Dec. 1, 1959 |